United States Patent
Zhong et al.

(10) Patent No.: US 9,398,528 B2
(45) Date of Patent: Jul. 19, 2016

(54) METHOD FOR ENERGY SAVING IN A MOBILE COMMUNICATION SYSTEM

(75) Inventors: Chongxian Zhong, Shanghai (CN); Fei Yin, Shanghai (CN); Tao Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 269 days.

(21) Appl. No.: 14/006,236
(22) PCT Filed: Mar. 13, 2012
(86) PCT No.: PCT/IB2012/000734
§ 371 (c)(1),
(2), (4) Date: Sep. 19, 2013
(87) PCT Pub. No.: WO2012/127325
PCT Pub. Date: Sep. 27, 2012

(65) Prior Publication Data
US 2014/0018077 A1 Jan. 16, 2014

(30) Foreign Application Priority Data
Mar. 21, 2011 (CN) .......................... 2011 1 0071649

(51) Int. Cl.
*H04W 52/02* (2009.01)
*H04W 28/08* (2009.01)
*H04W 36/22* (2009.01)

(52) U.S. Cl.
CPC .......... *H04W 52/0206* (2013.01); *H04W 28/08* (2013.01); *H04W 36/22* (2013.01); *Y02B 60/50* (2013.01)

(58) Field of Classification Search
CPC . H04W 52/0206; H04W 28/08; H04W 88/08; H04W 24/02; H04W 52/02; H04W 52/0219; H04W 52/0258; H04W 52/00; H04W 16/08; H04W 24/04; H04W 28/0226; H04W 28/0268; H04W 36/0061; H04W 36/0083; H04W 36/16; H04W 36/20
See application file for complete search history.

(56) References Cited

U.S. PATENT DOCUMENTS

2002/0141359 A1 10/2002 Jei
2007/0104162 A1 5/2007 Kneckt et al.

(Continued)

FOREIGN PATENT DOCUMENTS

CN 1538767 A 10/2004
CN 1870456 A 11/2006

(Continued)

OTHER PUBLICATIONS

"Study on Energy Savings Management (ESM)," 3rd Generation Partnership Project (3GPP), 3GPP TR 32.826, V10.0.0, pp. 1-33, France, Mar. 2010.

(Continued)

*Primary Examiner* — Liton Miah
(74) *Attorney, Agent, or Firm* — Fay Sharpe, LLP

(57) ABSTRACT

A method for energy saving in a mobile communication system—is provided in the invention. In the mobile communication system. OAM unit performs centralized management of the energy saving priorities. The respective base station obtains energy saving priorities thereof and energy saving priorities of adjacent base stations, and determine whether it is a candidate energy saving base station or a candidate compensating base station according to a load condition thereof, and energy saving priority information, thereof and energy saving priority information of adjacent base stations. The candidate energy saving base station can communicate with the adjacent base stations to negotiate about entering an energy saving procedure. With the technical solutions of the invention, OAM unit performs centralized management of the energy saving priorities, and each base station, can determine dynamically whether it is a candidate energy saving base station or a candidate compensating base station according to a load condition thereof, and energy saving priority information thereof and energy saving priority information of adjacent base stations and communicate with the adjacent base stations to negotiate about entering an energy saving procedure. Thus it is possible to accommodate flexibly and effectively a change to the load conditions so as to realize the energy saving of the system more reasonable with an alleviated influence of the energy saving procedure on the performance of the system.

12 Claims, 3 Drawing Sheets

(56) References Cited

U.S. PATENT DOCUMENTS

| | | |
|---|---|---|
| 2010/0290435 A1 | 11/2010 | Kazmi |
| 2011/0044284 A1* | 2/2011 | Voltolina .............. H04W 24/02 370/331 |
| 2012/0307700 A1* | 12/2012 | Nordberg et al. ............. 370/311 |
| 2012/0307701 A1* | 12/2012 | Moe ...................... H04W 24/02 370/311 |

FOREIGN PATENT DOCUMENTS

| | | |
|---|---|---|
| CN | 101326775 | 12/2008 |
| CN | 101400125 | 4/2009 |
| CN | 101835247 A | 9/2010 |
| KR | 10-2008-0046837 A | 5/2008 |
| WO | WO 2009/113928 A1 | 9/2009 |
| WO | WO2011/096860 A1 | 8/2011 |

OTHER PUBLICATIONS

International Search Report for PCT/IB2012/000734 dated Sep. 13, 2012.

* cited by examiner

METHOD FOR ENERGY SAVING IN A MOBILE COMMUNICATION SYSTEM

FIELD OF THE INVENTION

The present disclosure relates to mobile communication technology, and in particular to energy saving in a mobile communication system.

BACKGROUND OF THE INVENTION

A Radio Access Network (RAN) device is typically configured according to the capacity for processing traffic at a peak time. However the actual amount of traffic varies over time. For example, the amount of traffic is high in the daytime and low at midnight.

With the introduction of an advanced energy management mechanism, the device and some functions thereof can be disabled, or resource consumption of the device and some functions thereof can be limited, at a low amount of traffic (e.g., at midnight) for the purpose of energy saving. For example, a base station can operate at high transmission power in the daytime to support a higher amount of traffic and reduce its transmission power at a low amount of traffic at midnight. The base station can even enter a dormancy mode in which no data signal is transmitted at a very low amount of traffic. In this way, energy consumption throughout the system can be saved without degrading the quality of a service.

However, reduced transmission power or entering the dormancy mode may result in an influence on a signal coverage area and some user equipments may also have to be handovered to the neighboring base station. An energy saving base station and adjacent base stations thereof have to perform respective operations to adjust transmission power and maintain the user experience. For example, when a specific energy saving base station enters the dormancy mode, several adjacent base stations thereof have to boost transmission power to maintain signal coverage with no coverage holes.

However arbitrarily reduced transmission power may result in signal coverage holes and have a significant influence upon the user experience, and arbitrarily increased transmission power of an adjacent base station may result in serious inter-cell interference.

Therefore a requirement for a specific feasible technical solution is needed to save energy consumption of a system without degrading the quality of a service.

SUMMARY OF THE INVENTION

In the 3GPP Technical Specification (TS) and Technical Report (TR), only an upper concept of energy saving has been mentioned so far to disable a base station (e.g., an eNB, etc.) in different use scenarios for the purpose of energy saving. However no specific feasible technical solution for saving energy of a mobile communication system has been present.

In order to satisfy the foregoing requirement, the invention proposes a technical solution based on an energy saving priority to realize energy saving in a mobile communication system.

In an embodiment of the invention, there is provided a method for assisting energy saving in an OAM unit, which includes: receiving a load report of a serving base station; determining an energy saving priority of the base station at least partially based on the load and the type of the base station, wherein a base station with a higher load has a lower energy saving priority.

In an embodiment of the invention, there is proposed a method for energy saving in a base station, which includes the steps of: S1. obtaining energy saving priority information of the base station and its adjacent base stations from an OMA unit; and S2. determining whether the base station is a candidate energy saving base station or a candidate compensating base station according to a load of the base station and the energy saving priority information of the base station and its adjacent base stations, wherein the base station is a candidate energy saving base station when the base station has the highest energy saving priority and the load of the base station is below a first threshold or a second threshold, and the base station is a candidate compensating base station when the load of the base station is below a third threshold and the base station does not have the highest energy saving priority, wherein the third threshold is above the first threshold, and the first threshold is above the second threshold.

In an embodiment of the method for energy saving in a base station, the method further includes the step of S3. communicating with the adjacent base stations to negotiate about entering an energy saving procedure.

With the technical solutions of the invention, an Operation, Administration and Maintenance (OAM) unit performs centralized management of the energy saving priorities, and respective base stations perform distributed determination of an energy saving base station based on the energy saving priorities. Each base station can determine dynamically whether it is a candidate energy saving base station or a candidate compensating base station according to a load condition thereof, and energy saving priority information thereof and energy saving priority information of adjacent base stations and communicate with the adjacent base stations to negotiate about entering an energy saving procedure. Thus it is possible to accommodate flexibly and effectively a change to the load conditions of the respective base stations in the system, so as to realize the energy saving of the system more reasonable and effectively with an alleviated influence of the energy saving procedure on the performance of the system.

BRIEF DESCRIPTION OF DRAWINGS

With reference to the following detailed description of the non-restrictive embodiments, other features, objects and advantages of the present invention will be more apparent.

Wherein, through different figures, same or similar reference numerals refer to corresponding features.

DETAILED DESCRIPTION OF EMBODIMENTS

Those skilled in the art should appreciate that a base station can be denominated differently in correspondence to different protocol standards. For example, a base station is also referred to a node B or an evolved Node B (eNB) in an LTE system or an LTE-A system. A base station referred in this application refers, for example, but not limited to, an evolved Node B in an LTE system or an LTE-A system.

Figure 1:
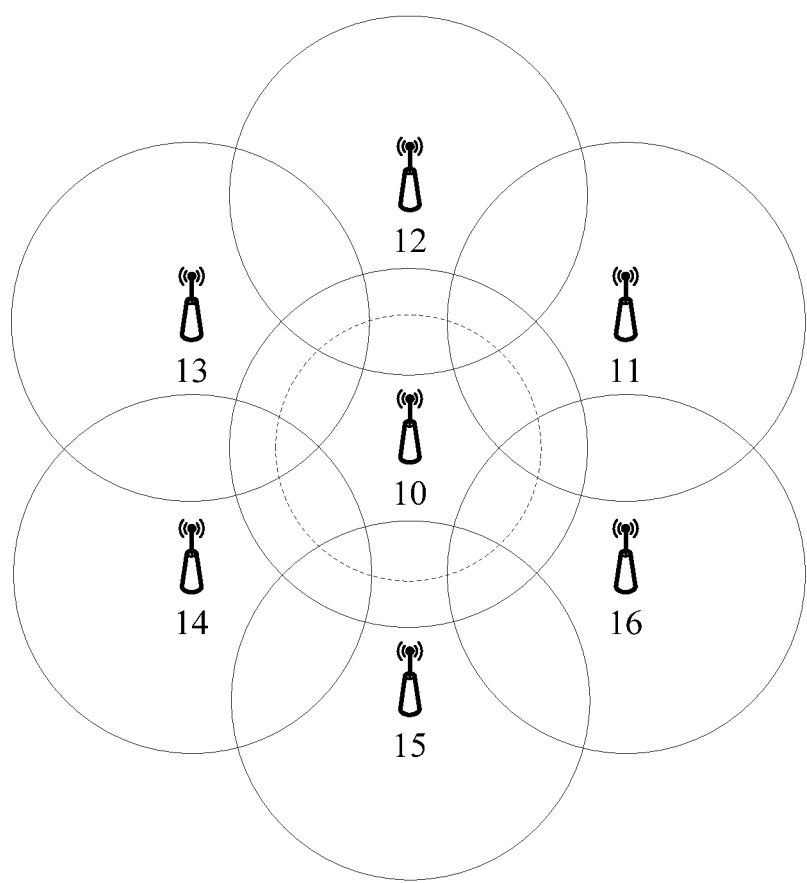
FIG. 1 illustrates a configuration schematic diagram of a base station (cell) in a mobile communication system according to an embodiment of the invention.

FIG. 1 illustrates a configuration schematic diagram of a base station (cell) in a mobile communication system according to an embodiment of the invention. Seven cells and respective base stations 10 to 16 thereof are illustrated, where the cells served by the base stations 11 to 16 are adjacent cells of the cell served by the base station 10, and all the base stations 11 to 16 are adjacent base stations of the base station 10. FIG. 1 illustrates a typical configuration in a cellular mobile communication system, and solid circles in the figure generally represent signal coverage areas of the respective base stations.

Figure 2:
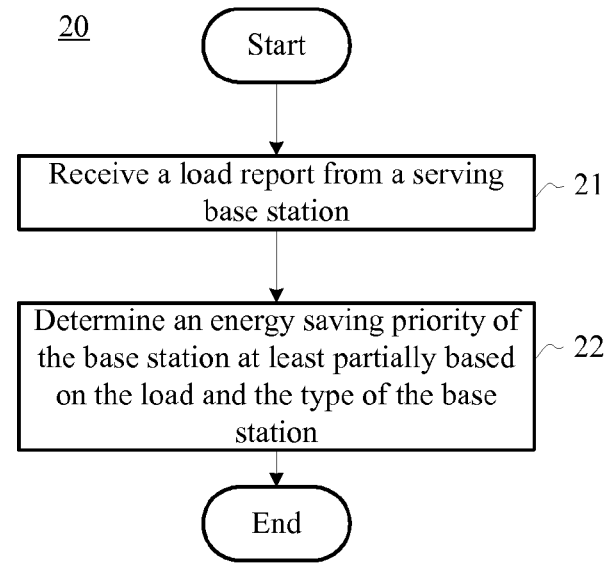
FIG. 2 illustrates a flow chart of a method 20 for assisting energy saving in an Operation, Administration and Maintenance (OAM) unit according to an embodiment of the invention.

FIG. 2 illustrates a flow chart of a method 20 for assisting energy saving in an Operation, Administration and Maintenance (OAM) unit according to an embodiment of the invention. As illustrated, the method 200 includes two steps 21 and 22.

In the step 21, the OAM unit receives a load report of a serving base station.

In the step 22, the OAM unit determines an energy saving priority of the base station at least partially based on the load and the type of the base station.

Wherein a base station with a higher load has a lower energy saving priority.

The load as referred here to is a quantified concept and includes any combination of the following options:
  A physical resource block actually used by a base station;
  A measurement of a user equipment in a cell served by the base station; and
  An interference condition in the cell served by the base station.

A specific combination can result from a function with the parameters set as the foregoing respective options. It is commonly appreciated that a base station with a larger number of actually used physical resource blocks has a higher load; a base station with a poorer measurement (e.g., reference signal received power, etc.) of a user equipment in a cell served by the base station has a higher load; and a base station with a worse interference condition in a cell served by the base station has a higher load. According to the requirement, any appropriate function can be selected to determine a load of a base station. In an embodiment of the invention, for example, a load can simply be equivalent to a physical resource block actually used by a base station.

A variety of different types of base stations, e.g., a macro base station (macro BS), a micro base station (micro BS), a pico base station (pico BS), a femto base station (femto BS), etc., may also exist in a same mobile communication system. The OAM unit shall further consider the type of a base station when it determines an energy saving priority of the base station. For example, two base stations with substantially the same load, one macro base station and one micro base station, then the OAM unit can determine a energy saving priority of the macro base station is higher than that of the micro base station.

In an embodiment of the invention, the method 20 further includes the step in which the OAM unit informs a base station about the energy saving priority information of the base station and its adjacent base stations thereof. Specifically, the informing progress can be performed by the OMA unit periodically or in response to a request from the base station. However a signaling overhead throughout the system can be further reduced when the informing progress is performed in response to a request from the base station.

Figure 3:
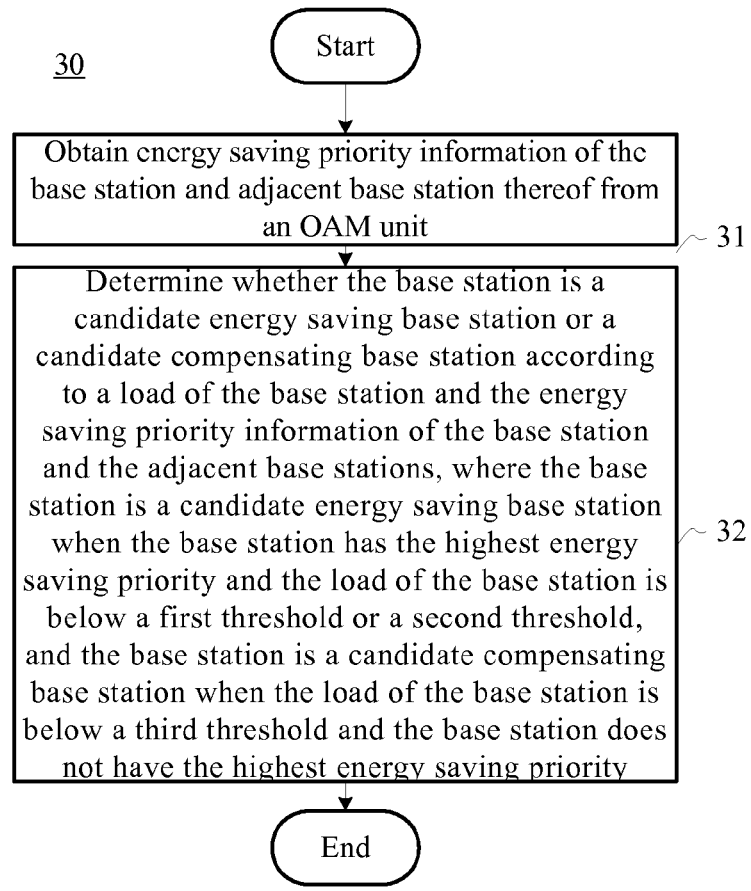
FIG. 3 illustrates a flow chart of a method 300 for energy saving in a base station according to an embodiment of the invention.

FIG. 3 illustrates a flow chart of a method 300 for energy saving in a base station according to an embodiment of the invention. As illustrated, the method 30 includes two steps 31 and 32 and will be described below by taking the base station 10 as an example with reference to FIG. 1 and FIG. 3.

In the step 31, the base station 10 obtains energy saving priority information thereof and energy saving priority information of its adjacent base stations (i.e., the base stations 11 to 16) from the OAM unit.

This step can be performed by that the OAM unit informing periodically about the energy saving priority information or by the base station 10 transmitting a request to the OAM unit according to the requirement.

In the step 32, the base station 10 determines whether the base station 10 is a candidate energy saving base station or a candidate compensating base station according to a load thereof, the energy saving priority information thereof and the energy saving priority information of the adjacent base stations (i.e., the base stations 11 to 16). A specific judgment result is determined from the load, energy saving priorities and three load thresholds. Wherein, the base station 10 is determined as a candidate energy saving base station when the energy saving priority of the base station 10 is the highest among the energy saving priorities thereof and of the adjacent base station 11 to 16 and the load of the base station 10 is below a first threshold or a second threshold. The base station 10 is determined as a candidate compensating base station when the load of the base station 10 is below a third threshold and the energy saving priority of the base station 10 is not the highest among the energy saving priorities thereof and of the adjacent base station 11 to 16. Wherein, the third threshold is above the first threshold, and the first threshold is above the second threshold.

As mentioned above, the load referred here to is a quantified concept and includes any combination of the following options:
  A physical resource block actually used by a base station;
  A measurement of a user equipment in a cell served by the base station; and
  An interference condition in the cell served by the base station.

A specific combination can result from a function with the parameters set as the foregoing respective options. It is commonly appreciated that a base station with a larger number of actually used physical resource blocks has a higher load; a base station with a poorer measurement (e.g., reference signal received power, etc.) of a user equipment in a cell served by the base station has a higher load; and a base station with a worse interference condition in a cell served by the base station has a higher load. According to the requirement, any appropriate function can be selected to determine a load of a base station. In an embodiment of the invention, for example, a load can simply be equivalent to a physical resource block actually used by a base station.

A variety of different types of base stations, e.g., a macro base station (macro BS), a micro base station (micro BS), a pico base station (pico BS), a femto base station (femto BS), etc., may also exist in a same mobile communication system. Regarding the aspects of transmission power, serving capacity and etc., different types of base stations have different configuration or requirement, so there is a set of three load thresholds (i.e., the first threshold, the second threshold and the third threshold) corresponding to a specific type of a base station. In the step 32, the base station 10 shall determine whether it is a candidate energy saving base station or a candidate compensating base station by using the set of thresholds corresponding to the type thereof.

In the method 300, an energy saving procedure can be initiated only for a candidate energy saving base station, and a possibly generated handover and coverage holes are generally performed by a candidate compensating base station. The energy saving procedure as referred in the invention to includes a reduced transmission power mode or a dormancy mode. The first threshold and the second threshold are one of triggering conditions respectively for these two energy saving modes to thereby make it possible to perform more flexible and refined energy saving management.

In an embodiment, the base station 10 transmits indication information to the adjacent base stations 11 to 16 to indicate its identity status of being a candidate energy saving base station or a candidate compensating base station upon determining itself as a candidate energy saving base station or a candidate compensating base station.

All the other base stations 11 to 16 also perform similar steps to respectively determine their respective identity status and to transmit corresponding indication information to adjacent base stations thereof. Then each base station can be aware of the identity statuses (of being a candidate energy saving base station or a candidate compensating base station or neither) thereof and of the adjacent base stations thereof.

When the base station 10 is a candidate energy saving base station, the method 30 further includes the step 33 (not illustrated) of the base station 10 communicates with the adjacent base stations thereof to negotiate about entering an energy saving procedure.

In an embodiment, when the base station 10 is a candidate energy saving base station and the load thereof is below the second threshold, the step 33 of the method 30 further includes:

Transmitting a request to an adjacent candidate compensating base station, the request indicating that the base station 10 desires to enter a dormancy mode; and The base station 10 entering the dormancy mode upon reception of a compensation acknowledgement from the adjacent candidate compensating base station.

That is, the loading being below the second threshold is one of the triggering conditions under which a candidate energy saving base station enters the dormancy mode. The candidate energy saving base station shall enter the dormancy mode with the support of an adjacent candidate compensating base station, a user equipment served by the candidate energy saving base station will be handed over to the adjacent candidate compensating base station and also a signal coverage area of the candidate energy saving base station will be covered by the adjacent candidate compensating base station. The adjacent candidate compensating base station is allowed to boost transmission power to cover possible coverage holes generated by that the candidate energy saving base station enters the dormancy mode.

For the base station 10 having entered the dormancy mode, it can be awoken by the signaling of the OAM unit or other upper units. When the OAM unit or the other upper units transmits a signaling message (for example, via an interface S1) to the base station 10 to instruct the base station 10 to exit the dormancy mode upon discovering from the address information of the user equipment that a user equipment in an area originally covered by the base station 10 has a load above the second threshold.

The load being between the first threshold and the second threshold is one of triggering conditions under which a candidate energy saving base station enters the reduced transmission power mode. In an embodiment, when the base station 10 is a candidate energy saving base station and the load thereof is below the first threshold and above the second threshold, the step 33 of the method 30 includes:—the base station 10 reduces transmission power thereof without generating a coverage hole. This embodiment typically happens in the event that there is no edge user which needs to be handed over in the cell served by the base station 10. The dotted circle in FIG. 1 generally illustrates a signal coverage area of the base station 10 at reduced transmission power.

In another embodiment, when the base station 10 is a candidate energy saving base station and the load thereof is below the first threshold and above the second threshold and there is an edge user which needs to be handed over in the cell served by the base station 10, the step 33 of the method further includes:—the base station 10 communicating with the adjacent candidate compensating base stations to negotiate about a handover of an edge user of the cell currently served by the base station 10. Specifically, the base station 10 can transmit a handover request to the adjacent candidate compensating base stations, and the adjacent candidate compensating base stations decide whether to accept the handover request according to their remaining load capacity. Next the base station 10 performs a handover upon reception of an acknowledgement of the adjacent compensating base stations to accept the handover request. Then the base station 10 reduces transmission power thereof without generating a coverage hole; or the base station 10 reduces transmission power thereof, and the adjacent candidate compensating base stations boost transmission power such that no coverage hole is generated.

In another embodiment, when the base station 10 is a candidate energy saving base station and the load thereof is below the first threshold and above the second threshold and there is an edge user which needs to be handed over in the cell served by the base station, the step 33 of the method 30 includes:

Transmitting a handover request sequentially to adjacent candidate compensating base stations with a received signal quality satisfying a predetermined condition according to the quality order of the received signal quality, based on the received signal quality report of the user equipment which needs to be handed over; and Handing over the user equipment which needs to be handed over upon reception of a handover acknowledgement from the adjacent candidate compensating base stations.

The received signal quality report here can include any combination of a Reference Signal Received Power (RSRP) indicator, a Received Signal Strength Indicator (RRSI), a Reference Signal Received Quality (RSRQ) indicator and a Channel Quality Indicator (CQI). That is, when a received signal quality of the user equipment for an adjacent candidate compensating base station does not satisfy a predetermined condition, the adjacent candidate compensating base station is not allowed to accept a handover of the user equipment, thereby ensuring the reception performance experience of the user equipment.

More specifically, in the foregoing step of transmitting the handover request, the base station 10 firstly transmits the handover request to those adjacent candidate compensating base stations with a load below the third threshold and above the first threshold; and these adjacent candidate compensating base stations will not accept a new handover when their load changes to be above the third threshold again. If the handover request of the base station 10 fails to be accepted and acknowledged or partially fails to be accepted and acknowledged, then the base station 10 transmits the handover request to those adjacent candidate compensating base stations with a load below the first threshold; and these adjacent candidate compensating base stations will not accept a new handover when their load changes to be above the first threshold again.

In an embodiment, when the base station 10 is a candidate energy saving base station and the load thereof is below the first threshold and above the second threshold and there is an edge user which needs to be handed over in the cell served by the base station 10, the step 33 of the method 30 further includes:

Transmitting the handover request to the adjacent candidate energy saving base stations when the adjacent candidate compensating base stations cannot accept the handover request.

In an embodiment, when the load of the base station 12 is below the third threshold and receives the handover request from the adjacent candidate energy saving base station 10, the method 30 further includes the following step besides the steps 31 and 32:

If a remaining load capacity of the base station 12 satisfies the handover request, then determining acceptance of a handover and transmitting a handover acknowledgement to the adjacent candidate energy saving base station 10.

In another embodiment, when the load of the base station 12 is below the first threshold and receives the handover request from the adjacent candidate energy saving base station 10, the method 30 further includes the following step besides the steps 31 and 32:

If a remaining load capacity of the base station 12 does not satisfy the handover request from the adjacent candidate power saving base station 10, then determining a user equipment which needs to be released to enable the remaining load capacity to satisfy the handover request from the adjacent candidate power saving base station 10; and Transmitting the handover request sequentially to adjacent candidate compensating base stations according to the quality order of the received signal quality, based on the received signal quality report of the user equipment which needs to be released.

Figure 4:
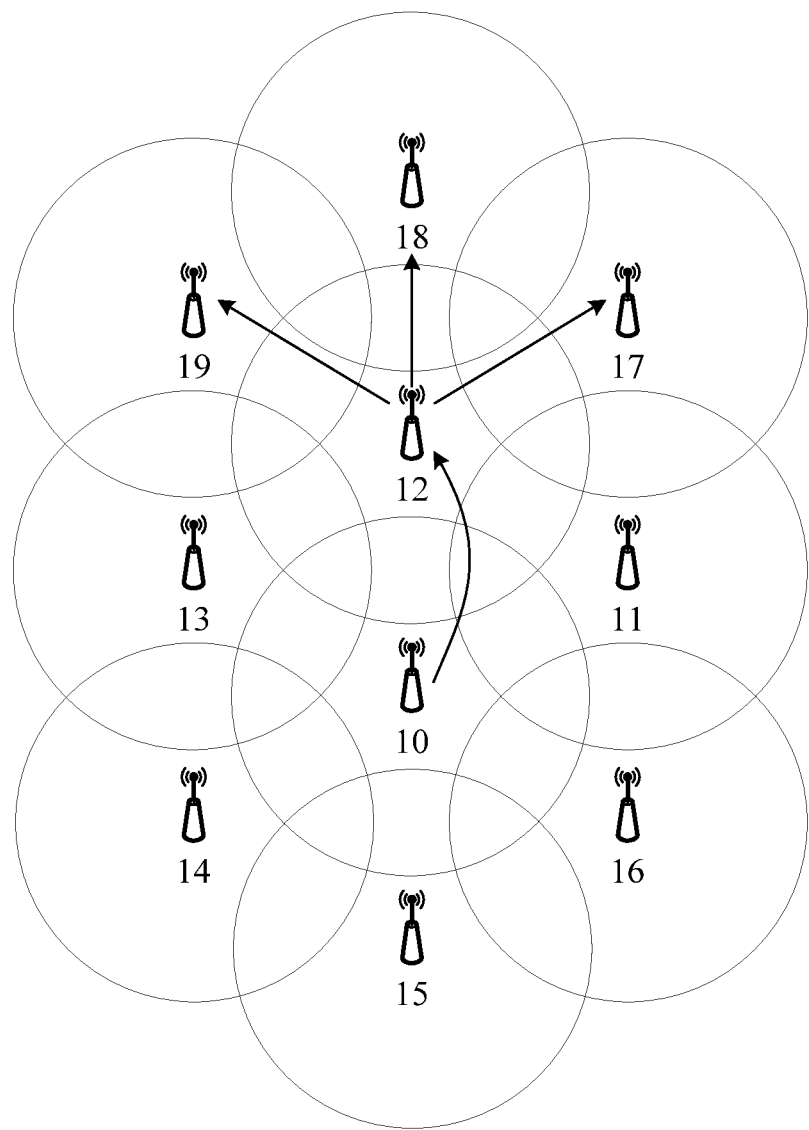
FIG. 4 illustrates a multi-hop handover of a load of a base station according to an embodiment of the invention.

Specifically, the base stations 11 to 16 can be referred to as a first-hop adjacent base station of the base station 10. The base stations 17 to 19 are the adjacent base stations of the base station 12, but not the adjacent base stations of the base station 10, and the base stations 17 to 19 can be referred to as a second-hop adjacent base station of the base station 10. The first-hop adjacent base station 12 with a load below the first threshold and with an insufficient remaining load capacity can transmit a handover request to its adjacent second-hop adjacent base stations 17 to 19 of the base station 10 in a similar way as the candidate energy saving base station 10 hands over an edge user. When the remaining load capacities of the second-hop adjacent base stations of the base station 10 still can not satisfy the demand, the handover request can be further transmitted to the third-hop adjacent base stations of the base station 10 to release a load. The procedure of more-hop adjacent base stations of the base station 10 is similar. The arrows in FIG. 4 generally illustrate such a manner of a multi-hop handover. Through this manner of a multi-hop handover, the possibility that a handover request of a candidate energy saving base station will be satisfied can be improved, thereby maximizing energy saving, and load balancing can be performed throughout the network.

In an embodiment, when those base stations with a load below the third threshold among the adjacent base stations of the candidate energy saving base station 10 still can not satisfy the requirement of the received signal quality of the user equipment which needs to be handed over by the base station 10, the candidate energy saving base station can further transmit the handover request to the adjacent base stations with a load above the third threshold to request these base stations to release a part of the load to the second-hop adjacent base stations in order to accept a handover from the base station 10. Then the foregoing manner of a multi-hop handover can be applied again.

In an embodiment, when the base station 10 is a candidate energy saving base station and there is no candidate power saving base station or candidate compensating base station among the adjacent base stations 11 to 16 thereof, the method 30 further includes the following step besides the steps 31 and 32:

Transmitting a request sequentially to the adjacent base stations in a descending order of power saving priorities to request the adjacent base stations for releasing a load so as to be able to accept the user equipment which needs to be handed over.

Specifically, the base station 10 firstly transmits a request to a first-hop adjacent base station with the highest energy saving priority to request it to release a load. The first-hop adjacent base station with the highest energy saving priority will perform the foregoing method 30 which would otherwise be performed by the candidate energy saving base station. If there is no candidate power saving base station or candidate compensating base station among those second-hop adjacent base stations of the base station 10 among the adjacent base stations of the first-hop adjacent base station of the base station 10, then the base station 10 transmits a request to a first-hop adjacent base station with the second highest energy saving priority to request it to release a load. The first-hop adjacent base station with the second highest energy saving priority will perform the foregoing method 30 which would otherwise be performed by the candidate energy saving base station. If the handover request of the base station 10 still can not be satisfied, then the base station 10 transmits a request to a first-hop adjacent base station with the third highest energy saving priority to request it to release a load, and so on.

If none of the first-hop adjacent base stations of the base station 10 can satisfy the handover request thereof, then the base station 10 further requests second-hop adjacent base stations to release a load in a descending order of energy saving priorities.

In another embodiment, there are two or more candidate energy saving base stations in a specific area, and the procedure of entering an energy saving mode can be initiated for these candidate energy saving base stations substantially at the same time. The common candidate compensating base stations of these candidate energy saving base stations process handover request from the candidate energy saving base stations with the principle of "First Come, First Served". Candidate energy saving base stations with the same energy saving priority will not accept a handover from each other.

With the technical solutions of the invention, an Operation, Administration and Maintenance (OAM) unit can perform centralized management of the energy saving priorities, and respective base stations perform distributed determination of an energy saving base station based on the energy saving priorities. Each base station can determine dynamically whether it is a candidate energy saving base station or a candidate compensating base station according to a load condition thereof, and energy saving priority information thereof and energy saving priority information of adjacent base stations and communicate with the adjacent base stations to negotiate about entering an energy saving procedure. Thus it is possible to accommodate flexibly and effectively a change to the load conditions of the respective base stations in the system, so as to realize the energy saving of the system more reasonable and effectively with an alleviated influence of the energy saving procedure on the performance of the system.

Those skilled in the art shall appreciate that the foregoing embodiments are exemplary but not limited. The different technical features appearing in the different embodiments can be combined to attain an advantageous effect. Those skilled in the art shall appreciate and make other embodiments as variants of the disclosed embodiments upon review of the drawings, the description and the claims. In the claims, the term "comprising/comprises" will not exclude other means or steps; the indefinite article "a/an" will not exclude plural; and the terms "first" and "second" are intended for denomination but not to indicate any specific order. Any reference numeral in the claims shall not be construed as the limitation to the scope of the invention. Functions of a plurality of components appearing in the claims can be performed by a separate hardware or software module. Some technical features appearing in different dependent claims will not mean that these technical features can not be combined to attain an advantageous effect.

The invention claimed is:

1. A method for energy saving in a base station, comprising:
obtaining energy saving priority information of the base station and its adjacent base stations from an Operation, Administration and Maintenance (OAM) unit; and
determining whether the base station is a candidate energy saving base station or a candidate compensating base station according to a load of the base station and the energy saving priority information of the base station and its adjacent base stations,
wherein the base station is a candidate energy saving base station when the base station has the highest energy saving priority and the load of the base station is below a first threshold or a second threshold, and the base station is a candidate compensating base station when the load of the base station is below a third threshold and the base station does not have the highest energy saving priority, and
wherein the third threshold is above the first threshold, and the first threshold is above the second threshold.

2. The method according to claim 1, wherein the load comprises any combination of the following:
a physical resource block actually used by the base station;
a measurement of a user equipment in a cell served by the base station; and
an interference condition in the cell served by the base station.

3. The method according to claim 1, further comprising:
transmitting indication information to the adjacent base stations to indicate that the base station is a candidate energy saving base station or a candidate compensating base station.

4. The method according to claim 1, wherein when the base station is a candidate energy saving base station, the method further comprises:
communicating with the adjacent base stations to negotiate about entering an energy saving procedure.

5. The method according to claim 4, wherein when the load of the base station is below the second threshold, the communicating comprises:
transmitting a request to an adjacent candidate compensating base station, the request indicating that the base station desires to enter a dormancy mode; and
the base station entering the dormancy mode upon reception of a compensation acknowledgement from the adjacent candidate compensating base stations.

6. The method according to claim 4, wherein when the load of the base station is below the first threshold and above the second threshold, the communicating comprises:
the base station reducing its transmission power without generating a coverage hole.

7. The method according to claim 6, wherein the communicating further comprises:
communicating with the adjacent candidate compensating base stations to negotiate about a handover of an edge user of a cell currently served by the base station.

8. The method according to claim 4, wherein the communicating further comprises:
transmitting a handover request sequentially to adjacent candidate compensating base stations with a received signal quality satisfying a predetermined condition according to the quality order of the received signal quality, based on the received signal quality report of the user equipment which needs to be handed over; and
handing over the user equipment which needs to be handed over upon reception of a handover acknowledgement from the adjacent candidate compensating base stations.

9. The method according to claim 8, wherein the communicating further comprises:
transmitting the handover request to the adjacent candidate energy saving base stations when the adjacent candidate compensating base stations cannot accept the handover request.

10. The method according to claim 1, wherein when the load of the base station is below the third threshold and the base station receives a handover request from adjacent candidate energy saving base stations, the method further comprises:
if a remaining load capacity of the base station satisfies the handover request, then determining acceptance of a handover and transmitting a handover acknowledgement to the adjacent candidate energy saving base stations.

11. The method according to claim 1, wherein when the load of the base station is below the first threshold and the base station receives a handover request from adjacent candidate energy saving base stations, the method further comprises:
if a remaining load capacity of the base station does not satisfy the handover request from the adjacent candidate energy saving base stations, then determining a user equipment needed to be released to enable the remaining load capacity to satisfy the handover request from the adjacent candidate energy saving base stations; and
transmitting the handover request sequentially to adjacent candidate compensating base stations according to the quality order of the received signal quality, based on the received signal quality report of the user equipment needed to be released.

12. The method according to claim 1, wherein when the base station is a candidate energy saving base station and there is no candidate energy saving base station or candidate compensating base station among its adjacent base stations, the method further comprises:
transmitting a request sequentially to the adjacent base stations in a descending order of energy saving priorities to request the adjacent base stations for releasing a load in order to accept the user equipment which needs to be handed over.

* * * * *